May 19, 1953  A. W. GRISWOLD ET AL  2,638,911
PNEUMATICALLY OPERATED CONTROL SYSTEM
Filed Dec. 1, 1950  2 Sheets-Sheet 2

INVENTORS
AUGUSTUS W. GRISWOLD
NATHANIEL B. NICHOLS
BY
D. Clyde Jones
ATTORNEY

Patented May 19, 1953

2,638,911

UNITED STATES PATENT OFFICE 2,638,911

PNEUMATICALLY OPERATED CONTROL SYSTEM

Augustus W. Griswold, Rochester, N. Y., and Nathaniel B. Nichols, St. Paul, Minn., assignors to Taylor Instrument Companies, Rochester, N. Y., a corporation of New York Application December 1, 1950, Serial No. 198,696

4 Claims. (Cl. 137—84)

This invention relates to a pneumatically operated control system for maintaining the value of a variable such as temperature, pressure, liquid level, rate of flow and the like, at a given value.

The main feature of the present invention relates to a pneumatically operated control system which insures prompt control action at the time of start up of a given process operation and which affords improved accuracy in control and yet utilizes apparatus which is less expensive than much of the control apparatus now in use.

Figure 1:
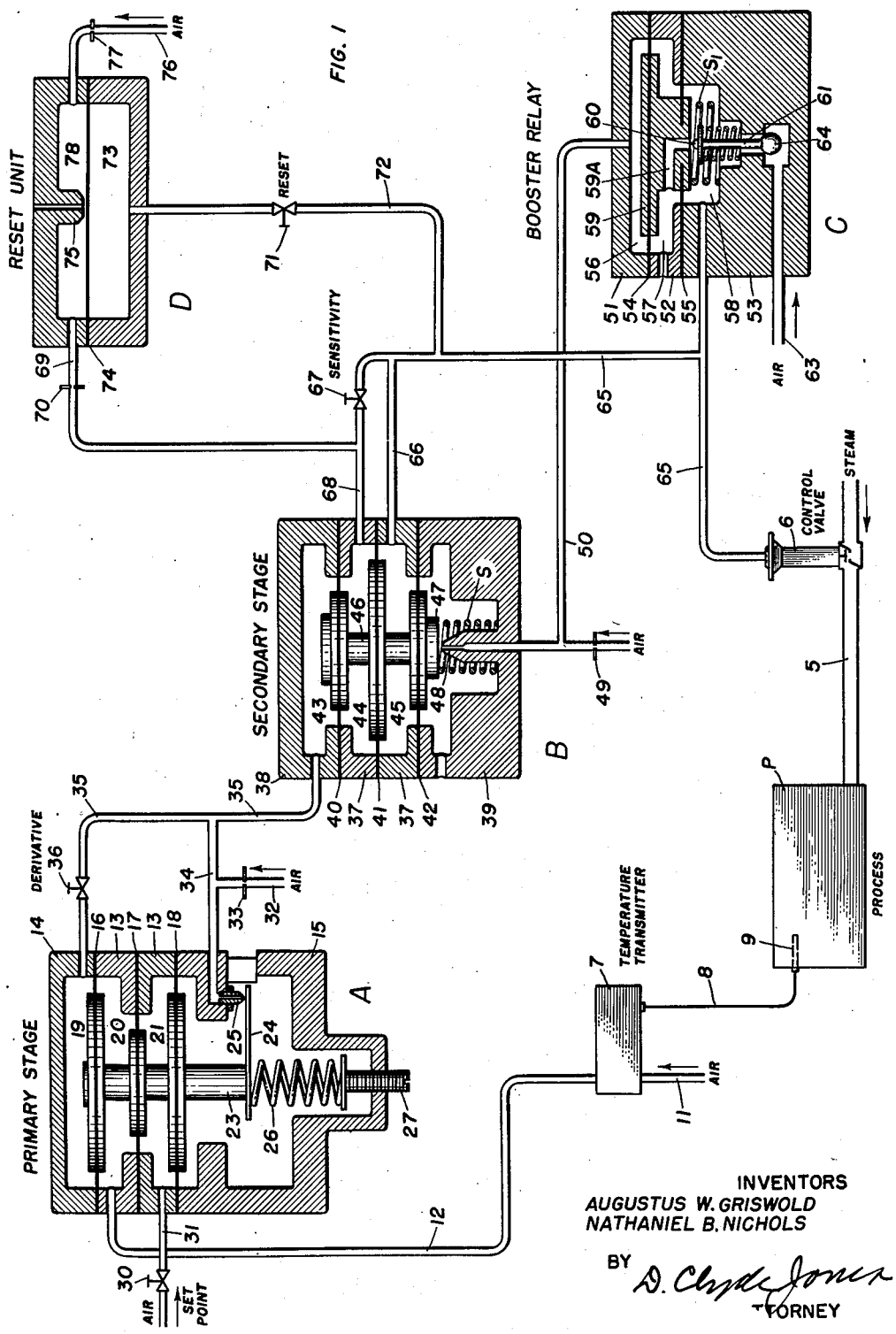
Figure 2:
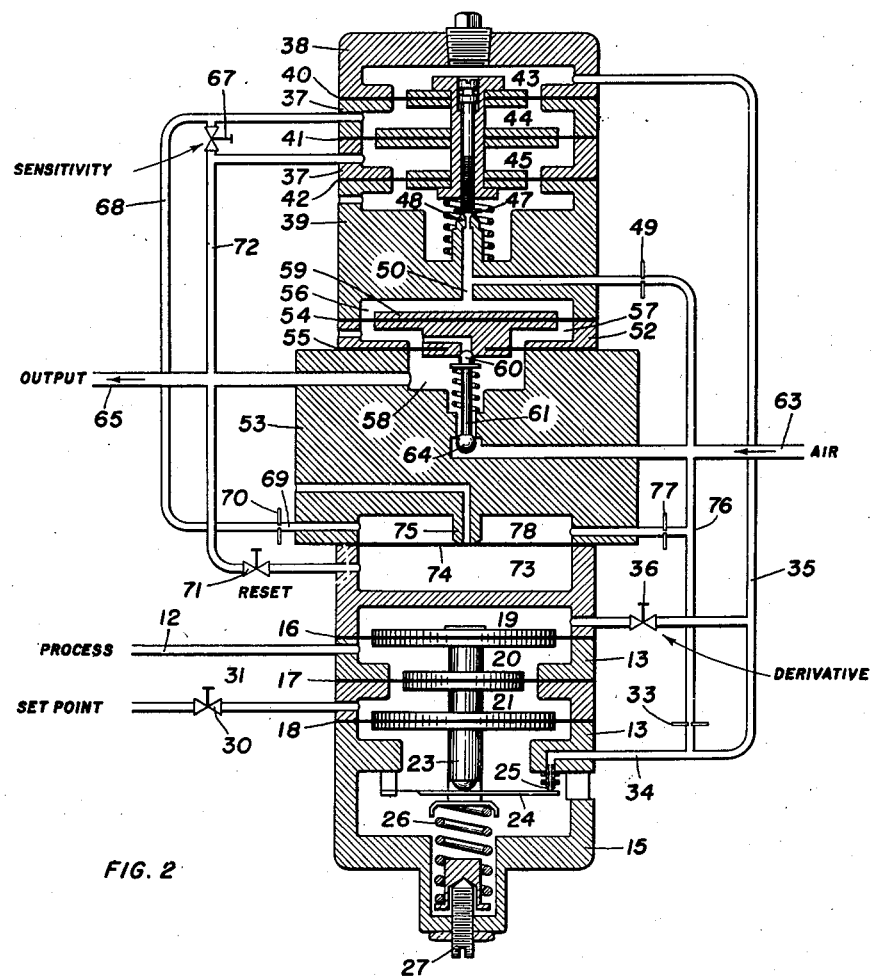
Figure 3:
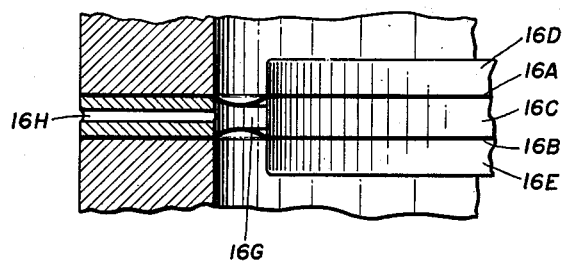

Other features of the invention will appear from the detailed description and claims when taken with the drawings in which Fig. 1 is a diagrammatic showing of the present control system with several units thereof separated for ease in disclosures; Fig. 2 is a sectional view indicating how several of the units of Fig. 1 can be combined into an integral commercial device; and Fig. 3 is a fragmentary sectional view of one of the diaphragm structures used in several of the units.

Referring to the drawings there is illustrated, by way of example, a system for the control of temperature of a given process P to which steam is supplied through the pipe 5 under the control of a diaphragm motor valve 6, the valve 6 being controlled by the system to admit the proper amount of steam into the process to maintain it at the desired temperature.

The temperature of the process is sensed by a temperature transmitter 7 including a capillary tube 8 of a tube system which terminates in a bulb 9 exposed to the process medium. This transmitter may be similar in construction to that disclosed in the patent application of Matner et al., Serial No. 790,776 filed December 9, 1947, now Patent 2,536,198, granted January 2, 1951. The temperature transmitter 7 transmits air under pressure from the source 11, at a signal pressure proportional to the temperature value sensed at the bulb 9. This proportional pressure is communicated through the pipe 12 to a primary unit A herein referred to as the primary stage. The primary unit is also in communication through pipe 31 and reducing valve 30 with a reference pressure at a set point or control value with which the signal pressure from the transmitter corresponds, when the temperature is at the control value. The primary stage is arranged to transmit an output pressure proportional to the deviation of the temperature from the control value and proportional to the rate of temperature deviation from the control value.

The unit A comprises a casing formed of a plurality of annular plates 13 together with a top cap 14 and a bottom cap 15. These plates and the caps together with diaphragms 16, 17, and 18 provide a plurality of chambers 19, 20 and 21. These diaphragms sealed at their margins and arranged in parallel relation, are secured at their centers to a pillar 23. The lower end of this pillar carries a baffle 24 which cooperates with an adjustably mounted nozzle 25 to vary the escape of compressed air therefrom. The lower end of the pillar 23 is engaged by a spring 26, the compression of which can be adjusted by a set screw 27. The signal pressure transmitted through pipe 12, is introduced into the chamber 20 while the desired set point or control pressure, the value of which is determined by the reducing valve 30, is supplied through the pipe 31 to the secondary chamber 21. The pressure in primary chamber 20 supplied by the pipe 12 and the pressure in the secondary chamber 21 which is the set point pressure, are applied to opposite sides of the diaphragm 17 so that the difference in these two pressures is effective to move the pillar 23 and the baffle 24 up or down depending upon whether the signal pressure or the set point pressure is the greater. A source of compressed air 32 is supplied through the restriction 33 to the pipe 34. This pipe communicates with the nozzle 25 to provide a variable output pressure determined by the relation between the baffle 24 and the nozzle 25. The output pressure in pipe 34 communicates with a secondary stage or unit B to be described. This output pressure also communicates through the branch pipe 35 and the adjustable needle valve 36 to the tertiary chamber 19, the pressure in chamber 19 tends to act in opposition to the difference in pressures in chambers 20 and 21. The needle valve 36 and the capacity of the chamber 19, as well as a supplemental capacity (not shown) if desired, acts as a delaying means which provides a delayed proportional pressure change in chamber 19. Without this delay, as results with valve 36 open wide so that it offers no resistance to the flow of air therethrough, the pressure in line 34 would be proportional to the difference between the signal pressure and the set point pressure. With this delay means, the pressure in line 34 is also proportional to the derivative or rate of change of the difference between the signal pressure and the set point pressure.

The unit B comprises a casing having a plurality of chambers defined in part by flexible diaphragms. The casing comprises annular plates 37, a top cap 38 and a bottom cap 39, together with parallel diaphragms 40, 41 and 42 defining the chambers 43, 44 and 45. The diaphragms 40, 41 and 42 are sealed at their margins and are mounted on a pillar 46 to move as a unit against the action of the biassing spring S. The output pressure in the pipe 34 from the first stage A is applied to the chamber 43. Any variation in the pressure thus applied, tends to move the baffle 47 carried by the lower end of the pillar 46, with respect to the nozzle 48. Compressed air from a suitable source, is supplied through the restriction 49 to the nozzle 48. As the baffle thus changes its position with respect to the nozzle 48, the output pressure in the pipe 50 will vary accordingly. This pressure is applied to a unit C, known as a booster relay.

The booster relay comprises a casing including the top cap 51, intermediate ring 52 and bottom cap 53 separated by diaphragms 54 and 55 to define the chambers 56, 57 and 58. The diaphragms are connected at their centers by a pillar 59 so that they operate as a unit against the biassing action of spring S' in response to the difference in pressures applied to their respective surfaces. The pillar 59 has a passage 59a therein leading to chamber 57 which communicates with the atmosphere through an opening in ring 52. Pillar 59 has a valve seat at the entrance to the passage 59a, controlled by a ball valve 60 provided at the upper end of an upwardly spring-biassed valve stem 61 governing the flow of air through the passage. Compressed air from a suitable source is supplied through the pipe 63 into chamber 58 under the control of a ball valve 64 carried on the lower end of the valve stem 61, and cooperating with a seat formed in the bottom cap at the entrance to chamber 58. The pressure in the chamber 58 is applied to the diaphragm 55 tending to oppose the pressure applied to diaphragm 54 comprising a part of the chamber 56. Compressed air is supplied from the chamber 58 through the pipe 65 which communicates with the diaphragm motor of valve 6, to position this valve so that the proper amount of steam is supplied through the pipe 5, to correct any deviation from the desired value of the process. The pipe 65 also communicates through the branch pipe 66 with a chamber 45 in unit B to effect a balance with the incoming pressure from unit A which is supplied to the chamber 43.

In order to adjust the sensitivity of the system, that is, the amount of opening of the valve 6 for any given temperature deviation in the process, pneumatic adjusting means are provided. There is also combined with this means, a reset unit D which automatically compensates for load changes in the process being controlled.

The controlled pressure from the output of the booster relay, is applied through the pipe 65, needle valve 67 and pipe 68 to chamber 44 of unit B. A source of reference pressure is also applied through the pipe 69 and restriction 70 into the chamber 44. It will be understood that by opening or closing the needle valve 67, the ratio of the controlled pressure in pipe 65 and the pressure in pipe 68 will be changed thereby adjusting the sensitivity of the controller.

If manual reset adjustment is used the reset unit D is omitted and the needle valve 71 is closed. Then the source of reference pressure is applied through the pipe 69, the reference pressure being adjusted by means of a well-known manually adjusted reducing valve (not shown).

However, in the present system automatic reset is provided to compensate for load changes in the process. In the present arrangement a branch 72 of the pipe 65 communicates through the needle valve 71 with the chamber 73 of the reset unit D. This chamber is defined by the casing of the unit D and by a flexible diaphragm 74. This diaphragm cooperates with a nozzle 75 which leads to the atmosphere. Compressed air from the source 76, is applied through the restriction 77 to the chamber 78 at the upper side of the diaphragm 74. The differential of the pressures in the chamber 73 and 78, moves the diaphragm 74 with respect to the nozzle 75 and thereby varies the pressure supplied through pipe 69 and the restriction 70. Thus the reference pressure supplied to the pipe 69 is determined by the controlled pressure supplied through the branch pipe 72 to the chamber 73. The needle valve 71 in pipe 72 determines the rate at which the pressure changes in the chamber 73 and thereby determines the reset time of the controller.

Preferably each of the nozzles 25 and 48 bleeds into a space at atmospheric pressure.

Each of the diaphragms have been shown in Figs. 1 and 2 as formed of a single sheet of flexible material reinforced at each surface of its central portion by a reinforcing disc leaving an annular hinging portion at the inner wall of the casing. Actually certain of these diaphragms, notably diaphragms 16, 17, 40 and 41 are preferably composite diaphragms of the construction illustrated in Fig. 3. In this construction, the diaphragm comprises two sheets 16A and 16B of rubber or the like mounted in superimposed parallel relation in the wall of the casing where their borders are sealed. The central areas of the two sheets are spaced by the disc 16C and are reinforced by the clamping discs 16D and 16E. The disc 16C together with the inner wall of the casing defines an annular space 16G which communicates with atmospheric pressure, through the opening 16H. Since the space 16G is always at atmospheric pressure the portions of the diaphragms 16A and 16B at the annular space will always bulge in the same directions as shown so that the control system will not be disturbed by a foreign response which would result if these portions were to "snap through" to bulge outward to the positions which are the reverse of those shown.

When the set point pressure in chamber 21 and the transmitted signal pressure in chamber 20 are equal, the equilibrium pressure in chamber 19 and in chamber 43 is maintained by the compression of spring 26, at the midspan position corresponding to a chosen intermediate value in the range between zero pressure and the pressure of this compressed air source which may be twenty pounds per square inch. The secondary stage is adjusted so that when the pressures in chambers 45 and 44 are equal, the pressure in chamber 43 is maintained at this same mid-span value by compression of spring S. When pressure in chambers 44 and 45 are equal, no further reset action occurs on motor diaphragm valve 6, and the pressure in chamber 43 is at the same mid-span value, determined by spring S.

In the operation of the system, let it be assumed that the temperature at bulb 9, is stable at the control point, then the signal pressure in pipe 12 and reference or set point pressure in pipe 31 are equal, at which time the pressures in chambers 20 and 21 are equal to each other and the pressure in chambers 19 and 43 are equal to each other. Then assume an increase in process temperature at bulb 9 which actuates the transmitter 7 causing it to deliver to the pipe 12 and to chamber 20 a signal pressure proportional to the value of the new temperature sensed at bulb 9. This increase in pressure in chamber 20, since it is greater than the reference pressure in chamber 21, tends to move the pedestal 23 upward thereby bringing baffle 24 closer to the nozzle 25. This movement of the baffle with respect to the nozzle, changes the back pressure in pipe 34 and branch pipe 35 leading to the chamber 43 of the secondary unit. The pressure in pipe 35 is also applied through needle valve 36 to chamber 19. The action of chamber 19 operating through the baffle 24 and nozzle 25 modifies the pressure in pipe 35 so that the resulting pressure supplied to chamber 43 is proportional to the value of temperature at bulb 9 and also proportional to the rate of change of the temperature.

The increase in the pressure in chamber 43 results in a downward movement of pillar 46 thereby bringing baffle 47 closer to nozzle 48. This relative movement of the baffle and the nozzle results in a change in pressure in pipe 50 such that the pressure in chamber 56 of the booster relay, increases. This causes the pillar 59 to move downward tending to move the ball 64 further from its seat with the result that air at increased pressure is supplied through the booster relay to pipe 65 leading to motor diaphragm valve 6. Valve 6 tends to close thereby reducing the amount of steam supplied to the process. The pressure in pipe 65 is also supplied through pipe 66 to chamber 45 tending to decrease the nozzle-baffle displacement which results in pneumatic sensitivity reduction. Also the pressure in the pipe 65 is supplied through needle valve 67 and branch pipe 68 to the chamber 44. The pressure change in pipe 65 is applied through the adjustable restriction or needle valve 67 which in combination with restriction 70 applies a fractional part of pressure change in pipe 65 to chamber 44. This action causes pillar 46 to bring nozzle and baffle into closer relationship and removes part of the original sensitivity reduction. It will be understood that the time constant, associated with filling or partially deflating chamber 44 is negligible.

In effecting reset action, the increase in the pressure in the pipe 65 is applied through pipe 72 and needle valve 71, to chamber 73. The increased pressure in chamber 73, tends to move diaphragm 74 toward the nozzle 75, thereby tending to cap-off this nozzle 75 which action tends to reduce the amount of air bleeding therethrough to the atmosphere with a consequent increase in pressure in chamber 73. It will be noted that a source of fluid at a reference pressure determined by a reducing valve (not shown), is supplied through restriction 77 to the chamber 78. The action of the diaphragm 74 and nozzle 75 by tending to cap-off nozzle 75 increases the pressure in chamber 78 and fluid at this pressure is supplied through pipe 69 and restriction 70 to the pipe 68 in turn leading to chamber 44. The action of the reset unit is such that the pressures in the chambers 73 and 78 have a one to one relation. The pressure change in pipe 65 in combination with restriction 71 and the capacity of chamber 73 effects a rate of change in the pressure supplied to pipe 69 and to chamber 44 of the secondary stage. This stage acts on the booster relay to effect a rate of change of pressure in pipe 65 which is applied to change the pressure applied to the motor diaphragm valve 6. Valve 6 tends to close thereby reducing the amount of heat supplied to the process. The further closing of valve 6 continues as long as the pressure in chambers 43 deviates from the predetermined mid-span value. Pressure in chamber 43 will deviate from this mid-span value as long as the temperature at bulb 9 deviates from the controlled point. A drop in temperature at the bulb 9 causes the system to operate in a similar manner but in the opposite sense.

While the system has been described as controlling temperature, it is adapted to control other variables encountered in industry.

What we claim is:

1. In a system for maintaining a variable condition at a given value, means for sensing the value of the condition, a primary unit portion comprising casing walls and parallel diaphragms functioning therewith to define primary, secondary and tertiary chambers, said primary chamber and said tertiary chamber acting in opposition to one another, an element connecting said diaphragms to partake of the resultant movement thereof, means for applying to the primary chamber fluid under pressure corresponding to the value of the variable condition, means for supplying fluid at a reference pressure to the secondary chamber, a source of fluid under pressure, an output pipe, valve means governed by the resultant movement of said element for controlling the pressure of signal fluid supplied from said source to said output pipe, means for supplying fluid to said tertiary chamber at a pressure related to the pressure of the signal fluid in said output pipe and at a rate proportional to the rate of change of the pressure in said output pipe, a secondary unit portion comprising casing walls and a group of parallel diaphragms defining therewith a signal pressure chamber, a balancing pressure chamber, a reset chamber, certain of said last named group of chambers acting in opposition to one another, a member connecting said diaphragms to partake of the resultant movement thereof, said signal chamber being responsive to the pressure of the signal fluid in said output pipe, a control pipe, a primary source of fluid under pressure, means including valve mechanism governed by said member for controlling the pressure of operating fluid supplied from said primary source to said control pipe, means for supplying said operating pressure fluid to said balancing chamber, a secondary source of fluid under pressure, means responsive to the operating fluid at the controlled pressure for controlling the pressure of the fluid from said secondary source, means including a pressure proportioning network comprising a pair of restrictions connected in multiple, at least one of which is adjustable and through which restrictions the operating pressure fluid and controlled pressure fluid from said secondary source are jointly supplied to said reset chamber whereby the pressure of the fluid in the reset chamber is proportional both to the pressure of the operating fluid and to the controlled pressure of the secondary source, the proportionality factors being dependent on the ratio of the resistance values of said restrictions.

2. In a system for maintaining a variable condition at a given value, means for sensing the value of the variable condition, a primary unit portion comprising casing walls and parallel diaphragms functioning therewith to define primary, secondary and tertiary chambers, said primary chamber and said tertiary chamber acting in opposition to one another, an element connecting said diaphragms to partake of the resultant movement thereof, means for applying to the primary chamber fluid under pressure corresponding to the sensed value of the variable condition, means for supplying fluid at a given reference pressure to the secondary chamber, a source of fluid under pressure, an output pipe, valve means governed by the resultant movement of said element for controlling the pressure of signal fluid supplied from said source to said output pipe, time delay means for supplying fluid to said tertiary chamber at a pressure related to the pressure of the signal fluid in said output pipe, said time delay means including the capacity of said tertiary chamber and a restriction through which the fluid is supplied to said tertiary chamber, a secondary unit portion comprising casing walls and a group of parallel diaphragms defining therewith a signal pressure chamber, a balancing pressure chamber, a reset chamber, certain of said last named group of chambers acting in opposition to one another, a member connecting said diaphragms to partake of the resultant movement thereof, said signal chamber being responsive to the pressure of the signal fluid in said output pipe, a primary source of fluid under pressure, an operating pressure pipe, means including valve mechanism governed by said member for controlling the pressure of operating fluid supplied from said primary source to said operating pressure pipe, means for supplying said operating pressure to said balancing chamber, a secondary source of fluid under pressure, adjustable means for controlling the pressure of the fluid from said secondary source, and means including a pressure proportioning network comprising a pair of restrictions connected in multiple through which restrictions the operating pressure fluid and controlled pressure fluid from said secondary source are jointly supplied to said reset chamber whereby the pressure of the fluid in the reset chamber is proportional both to the pressure of the operating fluid and to the controlled pressure of the fluid from the secondary source, the proportionality factors being dependent on the ratio of the resistance values of said restrictions.

3. In a system for maintaining a variable condition at a given value, means for sensing the value of the variable condition, a primary unit portion comprising casing walls and parallel diaphragms functioning therewith to define primary, secondary and tertiary chambers only, certain of which act in opposition to one another, an element connecting said diaphragms to partake of the resultant movement thereof, means for applying to the primary chamber fluid under pressure corresponding to the sensed value of the variable, means for supplying fluid at a given reference pressure to the secondary chamber, a source of fluid under pressure, an output pipe, valve means governed by the resultant movement of said element for controlling the pressure of signal fluid supplied from said source to said output pipe, means for supplying fluid to said tertiary chamber at a pressure related to the pressure of the signal fluid in said output pipe, a secondary unit portion comprising casing walls and a group of parallel diaphragms defining therewith a signal pressure chamber, a balancing pressure chamber, a reset chamber, certain of said last named group of chambers acting in opposition to one another, a member connecting said diaphragms to partake of the resultant movement thereof, said signal chamber being responsive to the pressure of the signal fluid in said output pipe, a primary source of fluid under pressure, an operating pressure pipe, means including valve mechanism governed by said member for controlling the pressure of operating fluid supplied from said primary source to said operating pressure pipe, means for supplying said operating pressure fluid to said balancing chamber, a secondary source of fluid under pressure, automatic reset adjusting means responsive to the operating fluid of the controlled pressure for controlling the pressure of the fluid from said secondary source, selectively adjustable means for varying the rate of response of said reset adjusting means, means including a pressure proportioning network comprising a pair of restrictions connected in multiple through which restrictions the operating pressure fluid and controlled pressure fluid from said secondary source are jointly supplied to said reset chamber whereby the pressure of the fluid in the reset chamber is proportional both to the pressure of the operating fluid and to the controlled pressure of the secondary source, the proportionality factors being dependent on the ratio of the resistance values of said restrictions.

4. In a system for maintaining a variable condition at a given value, means for sensing the value of the condition, a primary unit portion comprising casing walls and parallel diaphragms functioning therewith to define primary, secondary and tertiary chambers certain of which act in opposition to one another, an element connecting said diaphragm to partake of the resultant movement thereof, means for applying to the primary chamber fluid under pressure corresponding to the value of the variable condition, means for supplying fluid at a given reference pressure to the secondary chamber, a source of fluid under pressure, an output pipe, valve means governed by the resultant movement of said element for controlling the pressure of signal fluid supplied from said source to said output pipe, means for supplying fluid to said tertiary chamber at a pressure related to the pressure of the signal fluid in said output pipe and at a rate proportional to the rate of change of the pressure in said output pipe, a secondary unit portion comprising casing walls and a group of parallel diaphragms defining therewith a signal pressure chamber, a balancing pressure chamber, a reset chamber, certain of said last named group of chambers acting in opposition to one another, a member connecting said diaphragms to partake of the resultant movement thereof, said signal chamber being responsive to the pressure of the signal fluid in said output pipe, a control pipe, a primary source of fluid under pressure, means including valve mechanism governed by said member for controlling the pressure of operating fluid supplied from said primary source to said control pipe, means for supplying said operating pressure fluid to said balancing chamber, a secondary source of fluid under pressure, means responsive to the operating fluid at the controlled pressure for controlling the pressure of the fluid from said secondary source, means including a pressure proportioning network comprising a pair of restrictions connected in multiple, at least one of which is adjustable and through which restrictions the operating pressure fluid and controlled pressure fluid from said secondary source are jointly supplied to said reset chamber whereby the pressure of the fluid in the reset chamber is proportional both to the pressure of the operating fluid and to the controlled pressure of the secondary source, the proportionality factors being dependent on the ratio of the resistance values of said restrictions, and means tending to bias said member to a selected midspan position.

AUGUSTUS W. GRISWOLD.
    NATHANIEL B. NICHOLS.

References Cited in the file of this patent

UNITED STATES PATENTS

| Number | Name | Date |
|---|---|---|
| 1,371,243 | Hopwood | Mar. 15, 1921 |
| 2,441,405 | Fitch | May 11, 1940 |
| 2,517,051 | Swenson | Aug. 1, 1950 |
| 2,520,468 | Moore | Aug. 29, 1950 |

FOREIGN PATENTS

| Number | Country | Date |
|---|---|---|
| 544,643 | Great Britain | Apr. 22, 1942 |
| 544,753 | Great Britain | Apr. 27, 1942 |

OTHER REFERENCES

Moore Products Co., Philadelphia, Pa., Instructions 505-S for Nullmatic Controller, 1948, pages 2-7.